US008026791B2

(12) United States Patent
Kreiner et al.

(10) Patent No.: US 8,026,791 B2
(45) Date of Patent: Sep. 27, 2011

(54) METHODS, APPARATUSES, AND COMPUTER PROGRAM PRODUCTS FOR IMPLEMENTING REMOTE CONTROL PROCESSES

(75) Inventors: Barrett Kreiner, Woodstock, GA (US); Jonathan Reeves, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 826 days.

(21) Appl. No.: 11/764,921

(22) Filed: Jun. 19, 2007

(65) Prior Publication Data
US 2008/0318564 A1  Dec. 25, 2008

(51) Int. Cl.
*G05B 19/02* (2006.01)
(52) U.S. Cl. ...... 340/4.3; 340/5.2; 340/5.21; 455/404.1; 455/410; 455/420
(58) Field of Classification Search ............... 340/825.22
See application file for complete search history.

(56) References Cited

U.S. PATENT DOCUMENTS

| 5,128,667 | A  | * | 7/1992  | Enomoto et al. ......... 340/825.72 |
| 6,204,772 | B1 |   | 3/2001  | DeMay et al. |
| 6,658,586 | B1 |   | 12/2003 | Levi |
| 6,781,515 | B2 |   | 8/2004  | Kuzik et al. |
| 7,049,951 | B2 | * | 5/2006  | Rhodes et al. ................ 340/500 |
| 7,170,422 | B2 | * | 1/2007  | Nelson et al. ............ 340/825.72 |
| 7,398,077 | B1 | * | 7/2008  | Rao ............................... 455/410 |
| 7,679,525 | B2 | * | 3/2010  | Nielsen ..................... 340/825.72 |
| 7,725,400 | B2 | * | 5/2010  | Shionoya et al. ................ 705/59 |
| 7,735,131 | B2 | * | 6/2010  | Obata ............................. 726/19 |
| 2002/0019725 | A1 |   | 2/2002 | Petite |
| 2002/0072998 | A1 |   | 6/2002 | Haines et al. |
| 2005/0195078 | A1 |   | 9/2005 | Basinger et al. |
| 2005/0251405 | A1 |   | 11/2005 | Kreiner et al. |
| 2006/0063523 | A1 |   | 3/2006 | McFarland |
| 2006/0080726 | A1 | * | 4/2006 | Bodlaender et al. ............. 726/2 |
| 2006/0097903 | A1 | * | 5/2006 | Ku ................................. 341/176 |
| 2008/0177341 | A1 |   | 7/2008 | Bowers |

OTHER PUBLICATIONS

Final Office Action for U.S. Appl. No. 11/764,919 mailed Feb. 15, 2011.
Final Office Action for U.S. Appl. No. 11/764,923 mailed Mar. 11, 2011.

* cited by examiner

*Primary Examiner* — Benjamin C Lee
*Assistant Examiner* — Peter Mehravari
(74) *Attorney, Agent, or Firm* — Cantor Colburn LLP

(57) ABSTRACT

A method, apparatus, and computer program product for implementing remote control processes is provided. The method includes receiving a request to execute an operation on a target device via selection of a function key on a remote control device. The function key is associated with the operation and the target device that performs the operation for remotely controlling operation of the target device via a signal transmitted from the remote control device to the target device when the function key is selected. The method also includes approving the request to execute the operation when authorization has been secured, and transmitting the signal from the remote control device to the target device in response to the approval.

18 Claims, 9 Drawing Sheets

METHODS, APPARATUSES, AND COMPUTER PROGRAM PRODUCTS FOR IMPLEMENTING REMOTE CONTROL PROCESSES

CROSS REFERENCE TO RELATED APPLICATIONS

This application is related to commonly assigned U.S. patent application Ser. No. 11/764,919, entitled METHODS, APPARATUSES, AND COMPUTER PROGRAM PRODUCTS FOR DEVICE MANAGEMENT, filed on Jun. 19, 2007. This application is also related to commonly assigned U.S. patent application Ser. No. 11/764,923, entitled METHODS, APPARATUSES, AND COMPUTER PROGRAM PRODUCTS FOR IMPLEMENTING SITUATIONAL CONTROL PROCESSES, filed on Jun. 19, 2007. These applications are incorporated by reference herein in their entireties.

BACKGROUND

The present invention relates generally to remote control processes, and more particularly, to methods, apparatuses, and computer program products for providing authorized remote control over safety devices.

First responders and other emergency or management personnel oftentimes have very limited knowledge about the current conditions present at a location when an incident is reported. For example, it may be that an alarm was activated at a facility, which caused a first responding entity to be notified. However, the alarm activation itself may not provide sufficient information as to the nature and/or extent of the conditions within the facility. In fact, most first responders do not fully appreciate the nature and extent of conditions at a facility until they are physically present at the facility, and even then, may be not aware of all of the conditions needed to protect themselves and others.

Another disadvantage faced by first responders relates to the operation and procedures followed by various safety devices located throughout a facility. For example, suppose that a first responder detects smoke in one area of the facility. Suppose also that a sprinkler system was activated due to a level of heat detected in the area. Sprinkler systems are typically configured such that the heat of a fire will open a sprinkler head. As the fire spreads, additional sprinkler heads open, even those where the fire is no longer present. Alternatively, a concussion produced via a high-impact explosion has been known to cause many sprinkler heads to simultaneously open. These scenarios may cause a reduction in water pressure due to the number of active sprinkler heads. The reduction in water pressure, particularly in locations of the facility where the water is most needed, may negatively impact the first responders' efforts in containing the fire. In addition, if sprinkler heads are still active in an area that does not require the water, then valuable equipment, furnishings, and valuables may needlessly become damaged.

What is needed, therefore, is way to selectively and remotely operate (e.g., activate/de-activate) various devices in response to known conditions at a location. What is also needed is a way to control or restrict this selective operation based upon an authorization scheme.

BRIEF SUMMARY

Exemplary embodiments include a method for implementing remote control processes. The method includes receiving a request to execute an operation on a target device via selection of a function key on a remote control device. The function key is associated with the operation and the target device that performs the operation for remotely controlling operation of the target device via a signal transmitted from the remote control device to the target device when the function key is selected. The method also includes approving the request to execute the operation when authorization has been secured, and transmitting the signal from the remote control device to the target device in response to the approval.

Additional exemplary embodiments include an apparatus and computer program product for implementing remote control processes.

Other systems, methods, apparatuses, and/or computer program products according to embodiments will be or become apparent to one with skill in the art upon review of the following drawings and detailed description. It is intended that all such additional systems, methods, apparatuses, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

In accordance with exemplary embodiments, device management, situational control processes, and remote control processes are provided. Devices, e.g., safety devices, provide self-managing functions, such as inspections, testing, and alerts based upon selected rules and conditions. The self-managing functions may include performing one or more actions with respect to the devices based upon the selected rules/conditions.

Situational control processes include monitoring the presence of safety/peer devices and/or systems, and monitoring conditions present at a location within proximity of the device(s) implementing the situational control activities. The situational control processes provide a networked communications system that reacts to conditions detected by one or more of the devices that comprise the networked system. The devices may communicate in an ad-hoc, peer-to-peer communications infrastructure, or may be in communication with one another via a centralized host system, or both. In alternative embodiments, the devices communicate in a combination of networks (e.g., ad-hoc, centralized networks).

Remote control processes are enabled via a remote safety control device that is configured to communicate with one or more devices (e.g., safety devices) based upon permissions granted to the control device, in order to activate/de-activate, reset, or otherwise cause an operation to be performed on the targeted device.

The device management, situational control processes, and remote control processes are described herein with respect to safety devices. However, it will be understood that these services may be implemented for a variety of different devices and/or systems.

Figure 1:
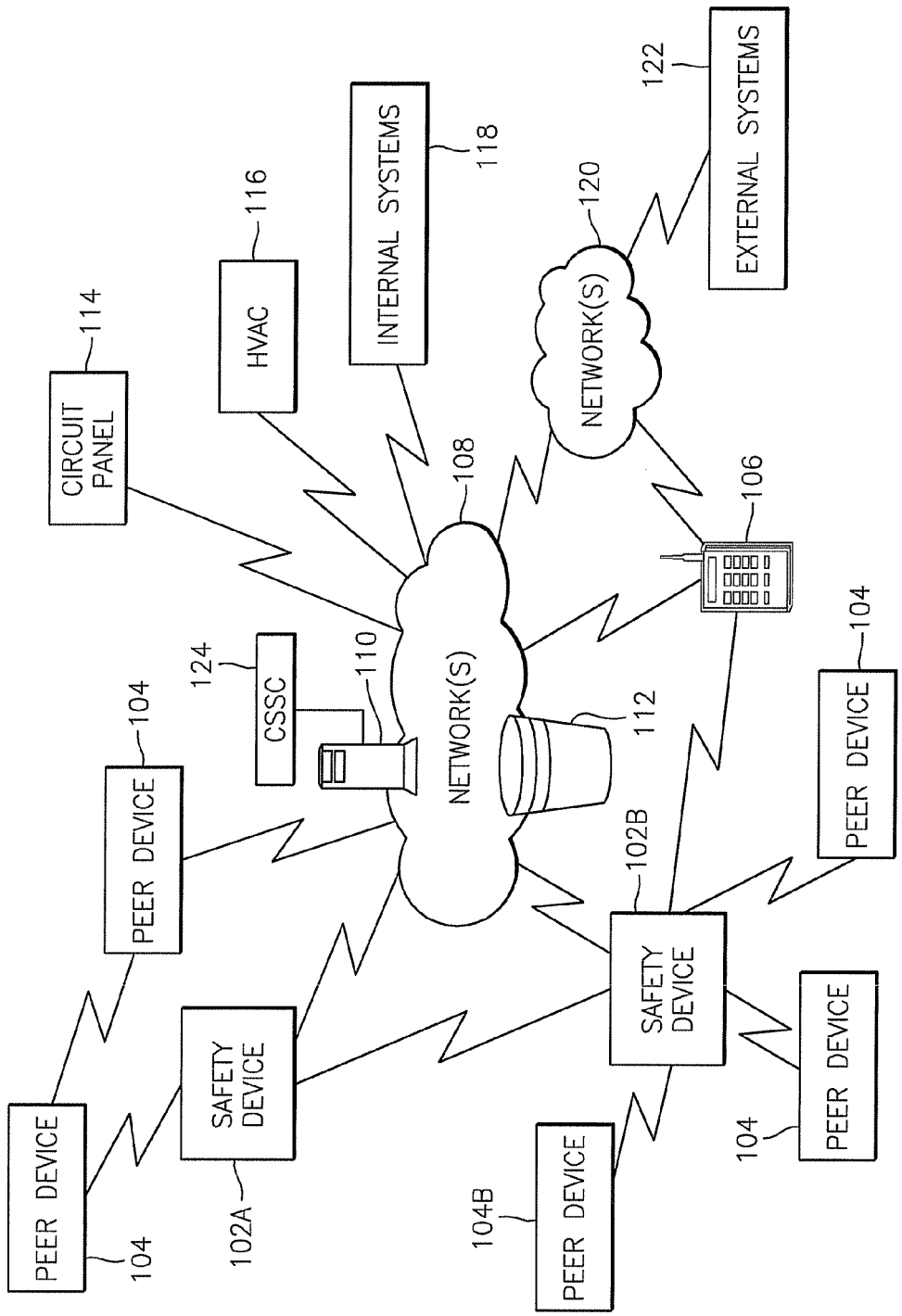
FIG. 1 depicts a system upon which the device management, situational control processes, and remote control processes may be implemented in exemplary embodiments.

Turning now to FIG. 1, a system upon which the device management, situational control processes, and remote control processes may be implemented in accordance with exemplary embodiments will now be described. The system of FIG. 1 includes safety devices 102, each of which is in communication with one or more peer devices 104 and network(s) 108. A safety device 102 refers to an apparatus that is used in facilitating the prevention and/or mitigation of conditions that may unfavorably impact the safety, security, and/or operation of a premises and/or the well being of individuals at or near the premises.

In exemplary embodiments, safety devices 102 and peer devices 104 provide a variety of self-management functions (i.e., device management processes), such as automated testing and inspections, inventory control, and information dissemination. Safety devices 102 may also perform situational control processes that are designed to minimize a condition detected at the premises and/or risk of injury that may result from the condition, and/or instruct another device (e.g., a safety device, peer device, and/or system) to perform an action. Safety devices 102 may include, for example, pull stations, sprinklers, and hazardous materials detectors (e.g., smoke, carbon monoxide, chemicals, etc.), to name a few. Safety devices 102 include may include communication components for communicating with one or more other safety devices 102, peer devices 104, etc., and may also include processors and logic for performing the device management and situational control processes described herein.

A peer device 104 also refers to an apparatus that is used in facilitating the prevention and/or mitigation of conditions that may unfavorably impact the safety, security, and/or operation of a premises and/or the well being of individuals at or near the premises. However, in exemplary embodiments, a peer device 104 serves a more passive role than the safety device counterparts described above with respect to the situational control processes. Peer devices 104 receive instructions from one or more safety devices 102 by way of communication signals and perform actions in accordance with the instructions. Peer devices 104 include communication components for sending and receiving communications as will be described further herein. Peer devices 104 include, for example, recording equipment, emergency exit lights, and safety lights, to name a few. It will be understood that a peer device 104 (e.g., an exit light), if configured with a processor and logic as described above with respect to the safety devices 102, may become safety devices themselves. Thus, the peer devices 104 may be defined by their limited or lack of information processing capabilities in addition to their functions as a device (e.g., illuminating an emergency exit). A peer device 104 may be configured to support and perform the requisite actions that are prompted by a safety device 102 to which it plays a subservient role. For example, the role of a peer device 104 may be to communicate its presence to a safety device 102 and become active or inactive at the request of the safety device 102.

Safety devices 102 and peer devices 104 may communicate with one another in a peer-to-peer network configuration via wired or wireless technologies (e.g., over-the-air radio signaling, 802.11 protocols, physical cabling, etc.). Safety devices 102 and peer devices 104 may also communicate with one another via host system 110 using, e.g., an area network, such as network 108. The network may be a wireless area network, local area network, etc.).

Also shown in the system of FIG. 1 is a remote safety controller 106. Remote safety controller 106 (also referred to herein as remote safety control device) refers to a wireless portable device that is used in implementing the remote control processes. Remote safety controller 106 is configured to control (e.g., activate/deactivate, reset, override, etc.) a safety device 102, peer device 104, and/or other configured systems. In exemplary embodiments, remote safety controller 106 is implemented by an individual who is tasked with responding to a safety condition or threat that is present or believed to be present at the premises. Remote safety controller 106 is described further herein (e.g., in FIG. 6).

Safety devices 102 and/or peer devices 104 may communicate with other entities over one or more networks (e.g., network(s) 108). As shown in the system of FIG. 1, a host system 110, storage device 112, circuit panel 114, heating, ventilation, air conditioning (HVAC) system 116, and internal systems 118 are each in communication with one another, as well as safety and/or peer devices over network(s) 108. In addition, one or more of these devices/systems may communicate with external systems 122 over other network(s) 120.

In exemplary embodiments, host system 110 is a high-speed processing device (e.g., a computer system) that is capable of handling high volume activities conducted via communications devices, such as safety devices 102, peer devices 104, remote safety controller 106 and other systems, such as circuit panel 114, HVAC 116, and internal systems 118. Host system 110 may be implemented by a facility (premises) that utilizes the safety devices 102, peer devices 104 and other systems shown in the system of FIG. 1. In the embodiment shown in the system of FIG. 1, by way of non-limiting example, the premises include elements 102 through 118. In exemplary embodiments, host system 110 executes a centralized safety systems control application 124 for performing a portion of the activities described herein with respect to device management, situational control processes, and/or remote safety control processes. Centralized safety systems control application 124 is described further herein.

In exemplary embodiments, host system 110 is in communication with a storage device 112 via, e.g., network(s) 108. Storage device 112 may be implemented using memory contained in the host system 110 or it may be a separate physical device. In exemplary embodiments, the storage device 112 is in direct communication with the host system 110 (via, e.g., cabling). However, other network implementations may be utilized. For example, storage device 112 may be logically addressable as a consolidated data source across a distributed environment that includes one or more networks 108. Information stored in the storage device 112 may be retrieved and manipulated via the host system 110. In exemplary embodiments, storage device 112 stores device records for safety devices 102, peer devices 104, and other network systems (e.g., circuit panel 114, HVAC 116, internal systems 118, etc.). A sample device record 400 is shown and described further in FIG. 4.

As indicated above, various systems may be in communication with one or more safety devices 102, peer devices 104, and/or host system 110. Circuit panel 114 (also referred to as a circuit breaker panel) refers to an electrical distribution board that provides a central point within a location (e.g., the premises of the system of FIG. 1) for distributing electricity throughout the location. The circuit panel 114 may be a commercial product utilized for enabling or disabling electrical circuits, e.g., during an emergency or for testing. In exemplary embodiments, the circuit panel 114 is equipped with communication elements for receiving signals from one or more safety devices 102, peer devices 104, remote safety controller 106, host system 110, or other systems within, or external to, the premises of FIG. 1. These signals, in turn, may cause circuit panel 114 to perform an action, e.g., enabling electrical circuits, disabling electrical circuits, or resetting the circuit panel 114. Used in this manner, circuit panel 114 becomes a peer device 104 with respect to the situational control processes. These features are described further herein. While only a single circuit panel 114 is shown in the system of FIG. 1 for illustrative purposes, it will be understood that multiple circuit panels may be implemented, each servicing a defined area within the location.

HVAC system 116 may be a commercial product that controls the temperature, ventilation, and may control other elements, such as humidity, pressure, etc. HVAC system 116 may include one or more control units dispersed throughout the premises of the system of FIG. 1. In exemplary embodiments, HVAC system 116 is equipped with communication elements for receiving signals from one or more safety devices 102, peer devices 104, remote safety controller 106, host system 110, or other systems within, or external to, the premises of FIG. 1. These signals, in turn, may cause HVAC system 116 to perform an action, e.g., opening or closing dampers, activating or increasing ventilation (e.g., via fans, exhaust), redirecting airflow, modifying thermostat settings, etc. Used in this manner, HVAC system 116 becomes a peer device 104 with respect to the situational control processes. These features are described further herein.

Internal systems 118 refer to various control and/or communications systems that may be distributed throughout the premises of the system of FIG. 1. For example, internal systems 118 may include an operations control center, security office, temporary incident command center established in response to a safety issue or incident, etc. Internal systems 118 may include communications devices (e.g., computers, telephones, cellular phones, pagers, etc.), electronic equipment, etc., for facilitating operations performed in furtherance of the duties prescribed with respect to each of these internal systems 118. For example, a security office may include a networked communications system that provides a direct link to, e.g., a local fire station, when an alarm is activated. Security office may also include video monitors that receive signals captured by security camera devices distributed throughout the premises.

As indicated above, the elements 102 through 118 represent the premises or facility implementing the device management, situational control processes, and remote control processes. In exemplary embodiments, one or more of these elements 102-118 are in communication with external systems 122 via network(s) 120. External systems 122 refer to entities outside of the premises of the system of FIG. 1, which provide a supporting role to the premises with respect to the safety control processes described herein. For example, external systems 122 may include emergency management entities, such as police, fire, 911, hospital, etc. Other examples of emergency management entities may include environmental hazard control agencies, biological hazard control agencies, anti-terrorism agencies, or other similar types of organizations. In yet another example, external systems 122 may include local utilities, e.g., gas, water, and/or electrical, that provide infrastructure services to the premises of the system of FIG. 1.

Figure 2:
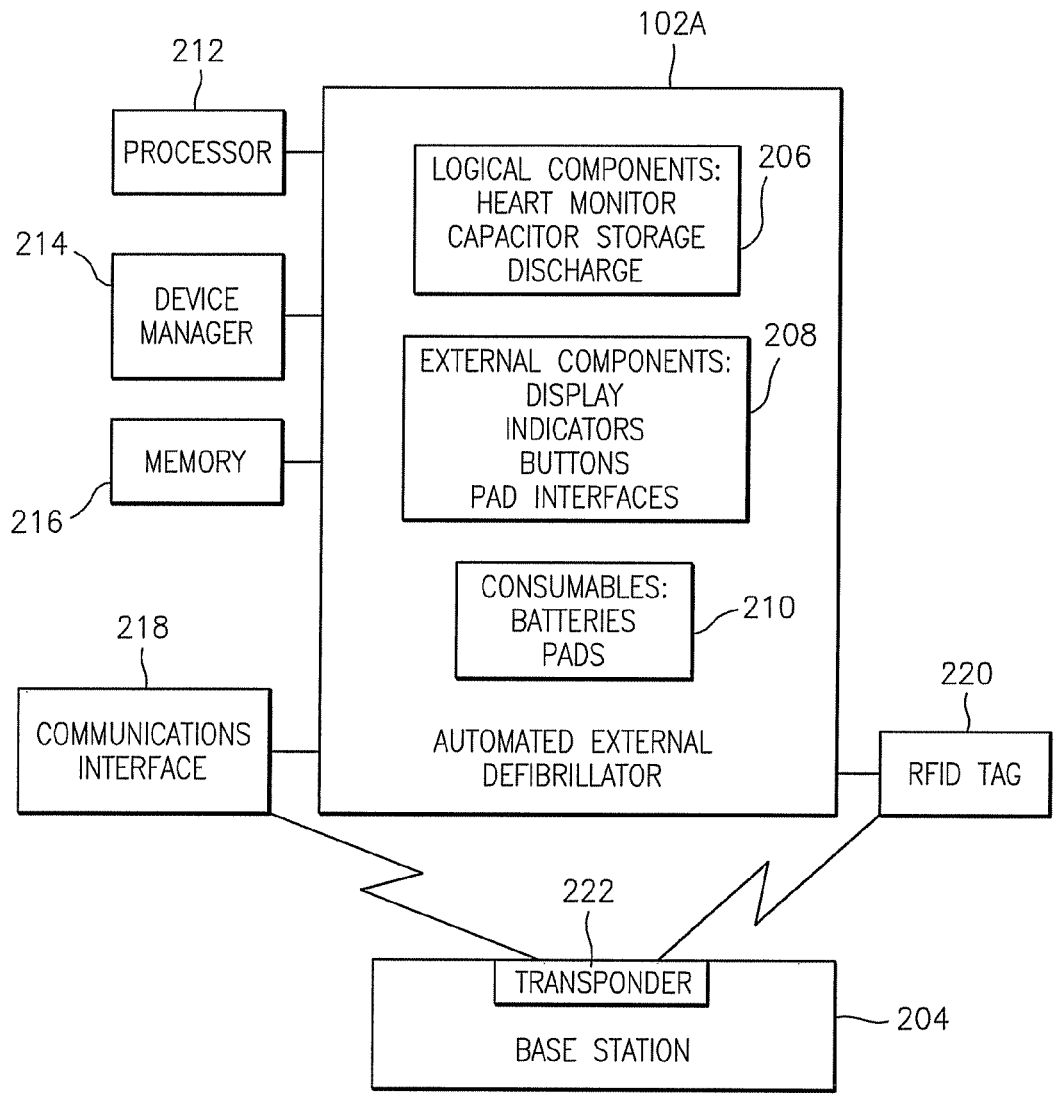
FIG. 2 illustrates a sample safety device configured for use in implementing device management, situational control processes, and remote control processes in exemplary embodiments.
Figure 3:
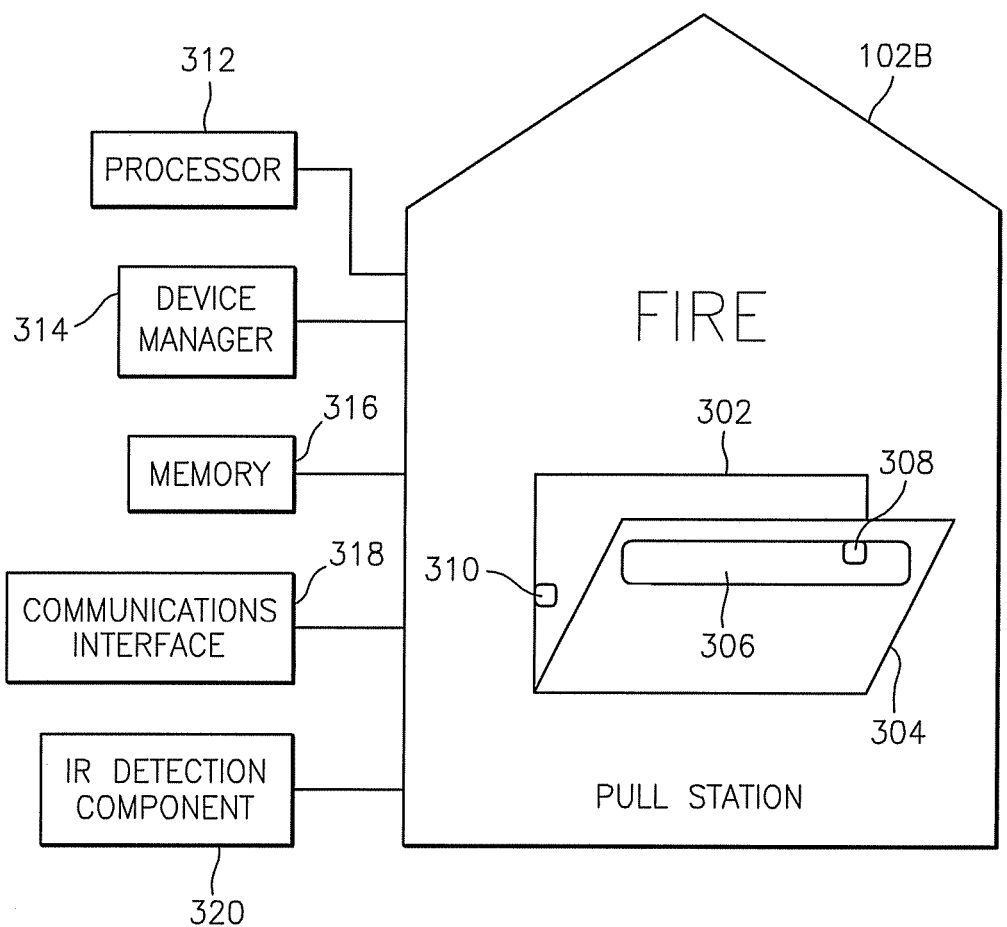
FIG. 3 illustrates another example of a safety device configured for use in implementing device management, situational control processes, and remote control processes in exemplary embodiments.

Security devices 102, peer devices 104, and/or other systems within the premises provide self-managing functions (e.g., device management) and situational control processes. Self-management functions may include inspections, internal testing, component inventory maintenance, and various responsive actions as described herein. Situational control processes include presence detection, condition monitoring and reporting, and various responsive actions as described herein. The information derived from these processes may be stored locally on the devices and/or distributed to other systems within the premises, such as other safety/peer devices, circuit panels, HVAC, internal systems, and/or host system 110, and/or systems outside of the premises, such as external systems 122. Two examples of safety devices are shown and described in FIGS. 2 and 3. Safety device 102A of FIG. 2 is described with respect to implementation of the device management processes, and safety device 102B of FIG. 3 is described with respect to implementation of the situational control processes. However, it will be understood that each of safety devices 102A and 102B may perform both device management and situational control processes.

Turning now to FIG. 2, a sample safety device 102A for implementing device management functions will now be described in accordance with exemplary embodiments. As an illustrative example, the safety device 102A of FIG. 2 refers to an automated external defibrillator (AED). AED 102A may be docked at a base station 204 when not in use. AED 102A includes logical components 206 (e.g., heart monitor, capacitor storage, and discharge), external components 208 (e.g., display screen, output indicators, buttons, and pad interfaces), and consumables 210 (e.g., batteries and pads). The device management activities of safety device 102A enable automated inventory control and management of the device 102A and its constituent components. For example, device management activities may include tracking the age, usage, inspection/testing histories, physical location, and other factors associated with the device 102A and its constituent components (e.g., components 206-210). Device management activities may further include automated testing and inspection of the device 102A and its components.

The safety device 102A includes a processor 212, a device manager application 214, memory 216, a communications interface 218, and a radio frequency identification (RFID) tag 220. Device manager application 214 executes via the processor 212 at the safety device 102A. Device manager application 214 includes logic for performing the device management activities described herein. Device manager application 214 generates a device record (e.g., record 400 of FIG. 4), which may be stored internally in memory 216 and/or may be transmitted to other devices or systems, e.g., host system 110 of FIG. 1. Device records may be used in tracking and maintaining devices including component inventory management.

Communications interface 218 enables safety device 102A to communicate with its base station 204, as well as other devices (e.g., devices 102B, 104) or other systems (e.g., circuit panel 114, HVAC 116, internal systems 118). Communications interface 218 may be implemented using wireless or wired communications technologies known in the art. In exemplary embodiments, communications interface 218 is a wireless communications component that receives and transmits communications between the device itself (i.e., device 102A) and other devices in range via an ad-hoc or peer-to-peer network using wireless communications protocols, such as 802.11, Bluetooth™, ultra-wide band (UWB), or other means. Communications interface 218 may also include, e.g., a peripheral component interconnect (PCI) card for discovering a network (e.g., network(s) 108 where network 108 includes a wireless local area network) and communicating with host system 110 or other system elements. Communications interface 218 may further include a radio transceiver or similar element for communicating with a radio frequency identification (RFID) tag (e.g., RFID tag 220).

As shown in FIG. 2, RFID tag 220 is affixed to AED device 102A. RFID tag 220 may store information about the device 102A and/or its constituent components, such as components 206-210. For example, RFID tag 220 may be encoded with the expiration dates of installed components, such as batteries and pads (i.e., consumables 210). In exemplary embodiments, base station 204 includes a transponder 222 that communicates with communications interface 218 and RFID tag 220. Upon request, or periodically, the information stored in RFID tag 220 may be provided to devices (e.g., 102, 104) or systems (e.g., host system 110) via, e.g., communications interface 218. Memory 216 may store one or more device records for the device.

According to an exemplary embodiment, device management functions are facilitated via configurable rules and conditions provided by the device manager 214. For example, device manager 214 may be configured to track the location (e.g., presence detection) and/or use of AED 102A via communication signals received from transponder 222, which activates when the AED 102A is removed from the base station 204. Device manager 214 may also be configured to perform automated testing of devices and device components, perform component inventory management, and other functions as described further herein (e.g., in the flow diagram of FIG. 5).

As indicated above, safety devices 102 facilitate the safety and security of individuals, equipment, and/or overall premises within which they operate. Safety devices 102 and peer devices 104 may be configured to communicate with one another in a peer-to-peer network for providing various safety functions. Turning now to FIG. 3, an example of a safety device 102B for use in implementing situational control procedures in exemplary embodiments will now be described. The safety device 102B shown in FIG. 3 refers to a pull station. In exemplary embodiments, and as further shown in FIG. 1, pull station 102B is in communication with a peer device 104B. Pull station 102B may be mounted securely on a wall at the premises of FIG. 1.

Pull station 102B includes an alarm activation element (not shown) that is housed in a compartment 302 of the pull station 102B. The compartment 302 includes a door 304 that is manipulated via an affixed handle 306. In exemplary embodiments, pull station 102B includes a processor 312, a device manager 314, memory 316, communications interface 318, and infrared (IR) detection component 320. The processor 312 and communications interface 318 may be implemented in a manner substantially similar to that described above with respect to AED 102A. Device manager 314 includes logic for implementing the situational control activities (as well as the device management processes) described herein. In exemplary embodiments, the pull station 102B is equipped with one or more sensors 308, 310 that are activated by, e.g., motion, touch, etc., such that when contact is made with the door (e.g., via sensor 308) or when the door is opened (e.g., as detected by sensor 310 placed in the opening of the compartment 302), the pull station 102B transmits a signal to another device (e.g., another safety device 102 or peer device 104, 104B). In alternative embodiments, one or more sensors (e.g., motions sensors) may be located a short distance from the pull station 102B in order to detect conditions present immediately prior to activation of the pull station (e.g., an individual walking in a direction toward the pull station). In this embodiment, peer device 104B refers to a recording device, such as a camera.

By communicating with the recording device 104B in response to activation of the sensor(s), various conditions that are present may be captured by the recording device 104B as directed by the pull station 102B. Suppose, for example, that pull station 102B has been subject to numerous activations that were subsequently determined to be false alarms (i.e., unlawful intentional activation). The device manager 314 may be configured to signal peer device 104B (i.e., camera recording device) to transmit previously recorded video and continue to transmit/record when one or both sensors 308, 310 have been activated.

These, and other, situational control functions may be facilitated via configurable rules and conditions provided by the device manager 314. For example, device manager 314 may be configured to transmit detection signals to other devices that are proximally located (within range) of the device executing the device manager 314. These detection signals operate to determine the presence of other devices in order to continuously assess the operational capabilities of these devices. Rules and conditions may be established for implementing responsive actions based upon the success or failure of the presence detection signals. In further exemplary embodiments, configurable rules and conditions may be implemented for determining conditions present in an area surrounding the device and determining appropriate responses. These and other features of the situational control processes are described further herein (e.g., in the flow diagram of FIG. 8)

Figure 4:
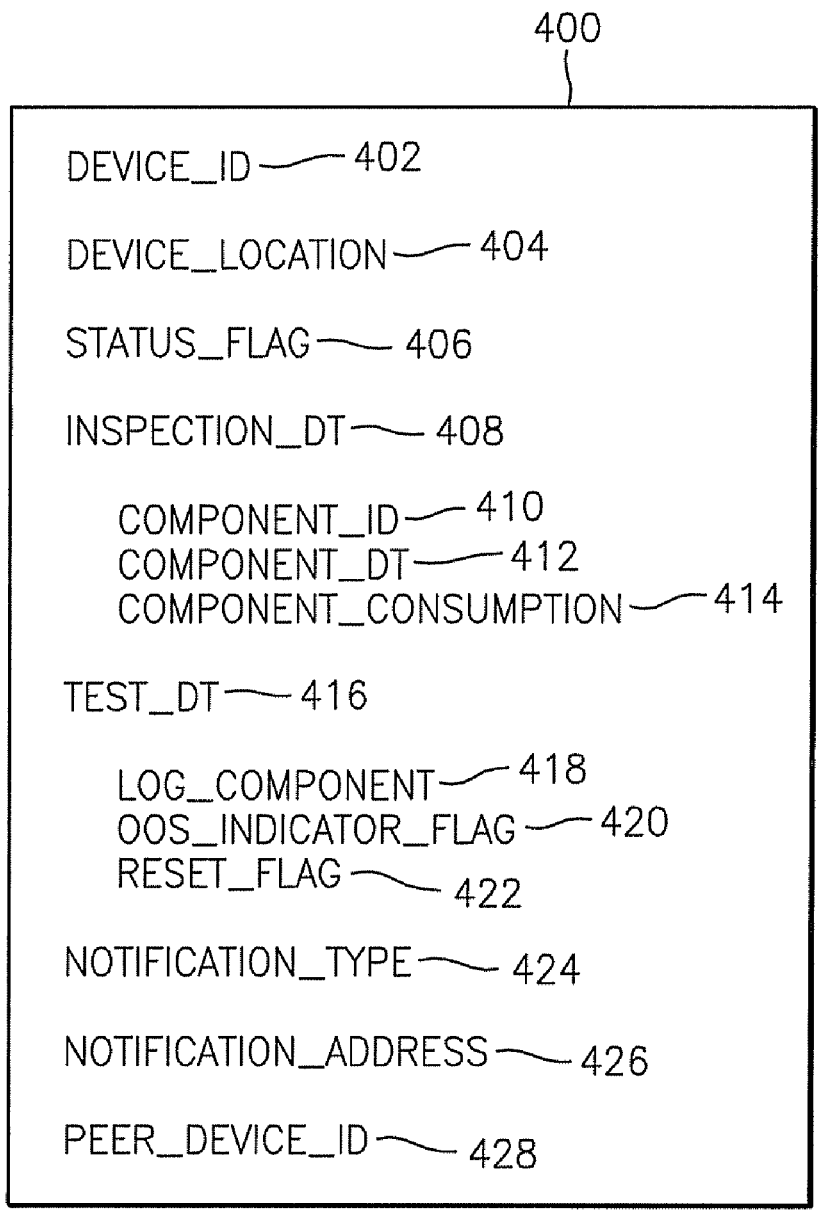
FIG. 4 depicts a sample device record generated for use in implementing device management and situational control processes in exemplary embodiments.
Figure 5:
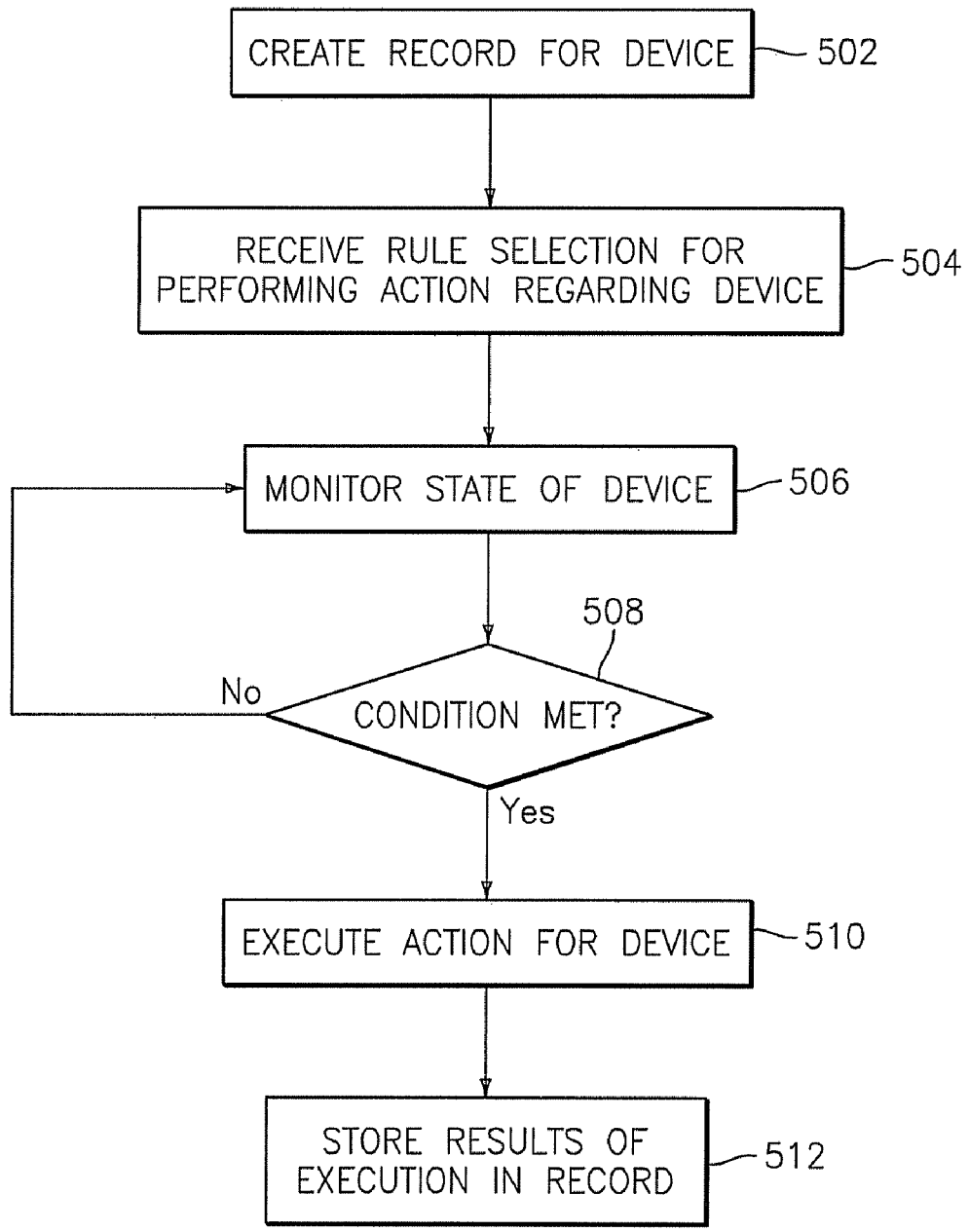
FIG. 5 is a flow diagram describing a process for implementing device management processes in exemplary embodiments.

Turning now to FIGS. 4 and 5, a device record 400 and flow diagram, respectively, describing a process for implementing the device management processes in exemplary embodiments will now be described. At step 502, a device record, such as the device record 400, is generated for a safety device 102 (e.g., safety device 102A, 102B). The record 400 may be created at the time the safety device is installed at the premises or may be created at the time the device management services and/or situational control processes are desired. As shown in FIG. 4, device record 400 includes a field that uniquely identifies each device (DEVICE_ID 402). Device record 400 further includes a DEVICE_LOCATION field 404 through which a device may be assigned a location. In many situations, safety devices are required to be located at specified locations (e.g., near electrical equipment, hazardous materials, or within a minimum distance of another safety device). The assigned location may be tracked by DEVICE_LOCATION field 404 as described further herein.

The device manager, such as device manager 214 (FIG. 2) and device manager 314 (FIG. 3) may include a user interface for facilitating user inputs in selecting from various rules for implementing the device management processes. The user interface may be facilitated via input/output elements on the device (e.g., the buttons/display on AED device 102A via external components 208) or by other means if limited input/output elements are provided on the device. For example, the device manager 214 may be installed and configured for a safety device via a computer system, e.g., host system 110, and then transferred to the device processor (e.g., processor 212 of AED 102A). In further alternative embodiments, the device manager 214, 314 may be pre-programmed by, e.g., a manufacturer of the device manager application 214, 314).

At step 504, one or more rules and conditions for managing the device 102 are configured via the device manager, e.g., 214, 314. Rules include actions to be performed with respect to the device when a corresponding condition has been met. Actions available in implementing the device management process may include, e.g., device inspection, device testing, device activation/de-activation, device reset, and notification generation. These rules may be stored in the record 400 created in step 502. As shown in FIG. 4, fields for tracking activities with respect to these rules include STATUS_FLAG 406, which may be used in presence detection, inspection fields 408-414, testing fields 416-422, and notification fields 424-426. The peer device field 428 is used in implementing the situational control processes described further herein.

At step 506, the device manager, e.g., 214, 314, monitors the state of the device in accordance with the rules and conditions. For example, the device manager 214 of FIG. 2 may be configured to perform internal testing of the devices components (e.g., logical components 206, such as heart monitor, capacitor storage, and discharge). The internal testing may be implemented by a commercial product installed on the device or may be a proprietary product that is integrated with the device manager application 214. The rules available for selection with respect to the internal testing may include conditions for activating the internal testing component of the device, such as upon request (e.g., button selection, remote signal, etc.), or may be based upon time (e.g., automatically initiate internal testing of one or more components daily, weekly, monthly, etc.). In addition, the test initiation may be configured based upon device usage (e.g., immediately following use of the device or removal of the device from its location, etc.) as determined by, e.g., a signal generated when the device is removed from its assigned location. In addition, the device manager 214 may be configured to perform an action in response to the testing via the configurable rules. For example, the results of the testing may be stored in the record 400 (e.g., TEST_DT 416 for indicating the test date and LOG_COMPONENT 418 for indicating the results of the testing with respect to each logical component) and, based upon the results, a notification or alert may be generated by the device manager 214 for notifying various entities or individuals (e.g., via NOTIFICATION_TYPE field 424, which specifies the type of alert including component failed, device failed, device missing from assigned location, device in use, etc.) and NOTIFICATION_ADDRESS field 426 which provides an address to which the notification will be sent.

Configurable rules may also be provided for causing the device to de-activate itself (e.g., removal from service) as a result of test results. Thus, by way of example, if one or more logical components are tested and a value threshold determined by, e.g., measurements taken during testing, is reached or exceeded, this may trigger the device manager 214 to de-activate the device (via, e.g., OOS_INDICATOR_FLAG 420) and, optionally, generate a notification alerting an entity of the situation.

In addition to testing, configurable rules for inspections may also be implemented via the device manager 214. As indicated above, the AED 102A includes a communications interface 218 and RFID tag 220. The configurable rules may include transmitting expiration dates (e.g., via date of incorporation into device or labeled expiration date) of consumable components 210 via transponder 222 and communications interface 218 when a condition is met (e.g., upon request, time-based, usage information, etc.). For example, component usage or consumption (e.g., remaining battery life) may be tracked via COMPONENT_CONSUMPTION field 414 and component expiration dates may be tracked via COMPONENT_DT field 412. In this manner, components of the device (e.g., inventory, consumption values, life expectancies, etc.) may be tracked in an automated fashion without human intervention. Various notifications may be generated for communicating results of the inspections via the configurable rules, in a manner similar to that described above with respect to testing processes.

Tracking the presence of portable safety devices (e.g., AED 102A) may be facilitated via the configurable rules of the device manager 214. A facility that utilizes AEDs needs to know the location (i.e., presence) of these devices at all times. Currently, an operator of an AED might not realize that an AED has been physically removed from its assigned location until the operator attempts to use it (i.e., when an emergency arises). This is not an ideal time to discover this information. The device manager 214 may be configured to track the presence (or absence) of the safety device (e.g., AED 102A) whereby a signal is transmitted between the device 102A and transponder 222 at the base station 204 when the device 102A has been removed from the base station 204. This signal, in turn, may cause the device manager 214 to initiate a notification for transmission to a specified entity or individual (e.g., configured via DEVICE_ID field 402, DEVICE_LOCATION field 404, STATUS_FLAG indicator 406, NOTIFICATION_TYPE 424, AND NOTIFICATION_ADDRESS 426 of record 400). In this manner, action can be taken to locate and return the device 102A to its assigned location specified in the record 400 before the next emergency arises.

At step 508, it is determined whether a condition has been met. As indicated above, the conditions may be selected for each rule by an authorized individual of the premises and may include, e.g., upon request, time-based, condition-based, usage-based, etc. as described above.

If a condition has been met, an action is executed for the device at step 510, and results of the execution may be stored in the device record 400 at step 512. As indicated above, the actions may include device inspection, device testing, device activation/de-activation, device reset, and notification generation.

If no condition has been met at step 508, the process returns to step 506 whereby the device manager, e.g., 214, 314, continues to monitor the state of the device 102.

Figure 6:
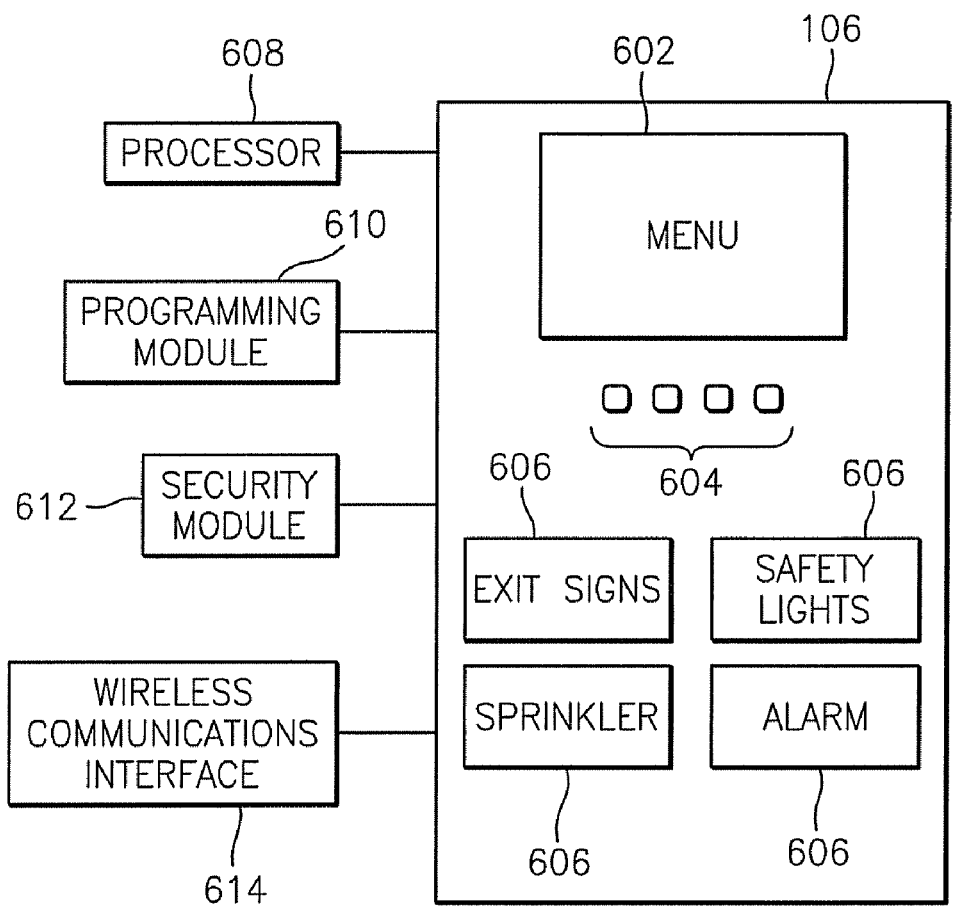
FIG. 6 depicts a remote safety control device configured for use in implementing situational control processes and remote control processes in exemplary embodiments.

Turning now to FIG. 6, a remote safety controller 106 configured for use in implementing situational control processes and remote control processes in exemplary embodiments will now be described. As indicated above, the remote safety controller 106 enables an individual, such as a first responder, to remotely control the operation of various safety devices 102, peer devices 104, or other systems of FIG. 1. These features may be particularly useful when a first responder has limited information about the conditions present at the facility. For example, it may be that an alarm was activated, which caused a communications transmission to a first responding entity. However, the alarm itself may not provide sufficient information as to the nature and/or extent of the conditions within the facility. The remote safety controller 106 enables the first responder or other individual to individually activate/de-activate, reset, etc., various devices based upon observed conditions at the premises. For example, suppose that a first responder detects smoke in one area of the facility. Suppose also that a sprinkler system was activated due to a level of heat detected in the area. The sprinkler heads will continue to open as the fire progresses, even when the fire is no longer in an area, or the heat column has spread past the actual burning area. This scenario may cause a reduction in water pressure due to the number of active sprinkler heads. If the first responder determines that the smoke/fire is contained in a small area within the facility, the responder may utilize the remote safety controller 106 to de-activate one or more sprinklers that are not needed in responding to the conditions. This de-activation, in turn, will increase the water pressure to the active sprinkler heads where the water is needed. By isolating the operation of selected devices, the first responder is better equipped to contain the situation. In addition, valuable equipment, such as electronics, may be salvaged by preventing unnecessary provisions of water to those areas which house these electronics.

In exemplary embodiments, remote safety controller 106 includes a display screen 602, input elements 604 and device options 606. Remote safety controller 106 also includes a processor 608, programming module 610, security module 612 and wireless communications interface 614.

Programming module 610 enables an authorized individual to program selected options available for use with the remote safety controller 106. These options may be employed for use in controlling a variety of operations with respect to devices, such as safety devices 102, peer devices 104, and/or other systems, e.g., systems 114-118. The options may include activating/de-activating the devices, resetting the devices, overriding the programmed operations of the devices (e.g., programmed via situational control processes), or other actions. Various levels of authorization may be programmed into the remote safety controller 106 via the security module 612. For example, a high ranking responder may have authority to override the operational functions of devices 102, 104, and/or other systems in the location. The operational functions refer to those functions which have been configured, e.g., via device managers 214, 314.

Security module 612 provides limits on the functions otherwise available via the remote safety controller 106 using, e.g., encryption technologies. In this manner, security module 612 ensures that the operational control over safety devices 102, 104 and other systems is only implemented by authorized individuals via the security module 612 of the remote safety controller 106.

Wireless communications interface 614 may be implemented via a radio transceiver, or similar technology. The wireless communication interface 614 communicates with devices, e.g., safety device 102B of FIG. 3, which in turn, includes a detection element (i.e., infrared detection component 320) for receiving signals transmitted by the remote safety controller 106. Other devices 102, 104, or systems may be configured for communicating with remote safety controller 106. For example, peer devices 104, such as exit lights, safety lights, alarm panels, emergency exits, etc., may be equipped with a communications interface and IR detection component for receiving signals from remote safety controller 106. Thus, a first responder or other individual may turn on safety lights, turn off alarm panels, unlock emergency exits, etc., as needed.

In alternative embodiments, the programming features described above may be implemented by the centralized safety systems control application 124 at host system 110 or remotely by internal systems (e.g., a computer device implemented by a temporary incident command center that is provisioned with the centralized safety systems control application 124), or a combination of the above. For example, remote safety controller 106 may be programmed to control various safety devices at the facility, which may then be modified or overridden by the temporary incident command center when an individual at the temporary incident command center becomes aware of critical information that may affect the safety of the first responder, including information of which the first responder is not aware. Thus, the shared features of the remote control processes may provide advantages in that various entities with different perspectives of conditions present at the facility may cooperatively perform responsive activities in furtherance of containing the situation throughout the course of the response period. Configuration and operation of the remote safety controller in performing the remote control processes are described further herein (e.g., FIG. 9).

Figure 7:
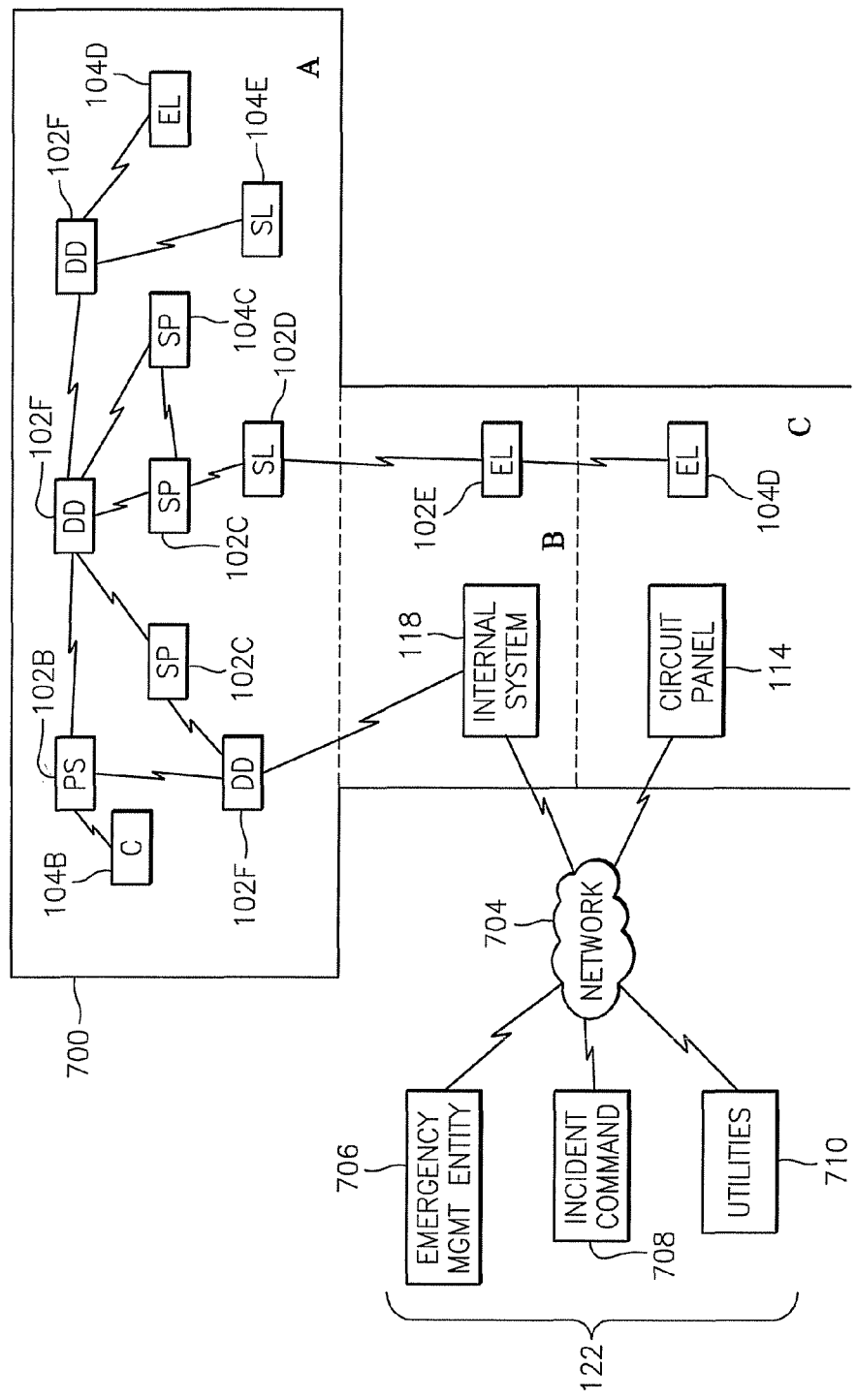
FIG. 7 illustrates a sample system including safety devices and peer devices configured for use in implementing situational control processes and remote control processes in exemplary embodiments.

Turning now to FIG. 7, a detailed embodiment of a system for implementing the device management, situational control processes, and remote control processes in exemplary embodiments will now be described. The system of FIG. 7 includes a facility 700 comprising three areas, A, B, and C. As shown in FIG. 7, an ad-hoc network of safety devices 102, peer devices 104, and systems 114, 118 are in communication with one another, as well as with external systems 122, which include emergency management entity 706, incident command 708, and utilities 710 via a network 704. Network 704 may be an inter-network, such as the Internet.

Safety devices 102 include pull station 102B, sprinkler heads 102C, safety lights 102D, exit lights 102E, and detection devices 102F. Detection devices may include smoke detectors, temperature sensors, chemical detectors (carbon dioxide, carbon monoxide, hazardous materials, etc.), motion sensors, or any similar type of device. Peer devices 104 include camera 104B, sprinkler head 104C, and exit lights 104D. As indicated above, safety devices 102 are defined, in part, by their information processing functions. Thus, for example, an exit light may be configured as both a safety device 102E and a peer device 104D. Safety devices 102 may be configured via device manager 214 to perform one or more actions in response to an event. These actions may include instructing the activation/de-activation, reset, recording, communication, etc., of the device itself or other devices that are in range (e.g., safety devices 102, peer devices 104, systems 114, 118). In a sample configuration, pull station 102B may be configured to instruct camera 104B to record in response to a sensor signal indicating, e.g., smoke, heat, motion, etc. The instruction may include transmitting the recorded information to another device or system configured via the device manager 214, 314.

Safety devices 102 may be configured to have a relationship with other specified devices or systems. For example, as shown in FIG. 7, one of detection devices 102F is linked for communicating with pull station 102B, one of sprinkler heads 102C, and internal system 118. This device 102F may also indirectly communicate to other devices via the linked configuration to the devices described above. Thus, if detection device 102F activates sprinkler head 102C (with which it directly communicates), this may cause sprinkler head 102C to notify another detection device 102F (with which the sprinkler head 102C communicates) so that the other detection device 102F may use this information in order to determine whether a second sprinkler head 102C (that is in direct communication with the other detection device 102F), should be activated.

In another example, a safety device 102A receives information from one or more devices in its range and instructs safety lights and exit lights (peer devices) that are located in an area that is designated to be safe to turn on. Likewise, safety lights and exit lights (peer devices) that are located in an area of the facility that is determined to be unsafe may be instructed to turn off so that occupants may be guided out of the facility via the safest route. A collection of information received from various devices may be considered by the receiving safety device 102 in determining which actions, if any, should be taken.

The information received by safety devices 102 may be transmitted to, e.g., internal system 118, and optionally, to incident command 708 where information is gathered and evaluated prior to taken responsive actions. This information, e.g., sensor data, camera recordings, hazardous materials measurements, may be useful to individuals at the incident command 708 when programming remote safety controller 106 for use by a first responder. The information may also be useful in determining a best route (e.g., entrance point to the facility, hallway, etc.) for the responders. Thus, the information acquired from the safety devices may provide sufficient details about the current conditions so that appropriate actions may be taken. Where multiple conditions exist, this information may provide details that enable incident command members to prioritize responsive action plans.

As indicated above, various systems may be configured to become safety devices 102 or peer devices, including circuit panel 114, HVAC 116, internal systems 118, etc. This may be useful in performing responsive actions based upon conditions that affect electrical hazards, air quality hazards, and other situations. For example, if HVAC system 116 of FIG. 1 is configured as a peer device 104, a co-located safety device 102 may be configured to activate/de-activate various functions provided by the HVAC system 116. Suppose, for example, that a facility utilized hazardous materials in its daily operations. HVAC system 116 and its components may be configured so that the air flow direction or pressure may be altered in desired areas of the facility to improve the air quality based upon the information acquired from the safety devices 102, peer devices 104, or other systems. In a similar manner, circuit panel 114 may be configured so that electricity is shut off during an emergency. Likewise, safety devices 102 may transmit signals to utility service providers (e.g., gas, electricity, water, etc.), such as utilities 710 to activate/de-activate utilities services or simply provide information about the conditions present at the facility (e.g., notifying a gas utilities service provider that a large fire has broken out at the facility and that neighboring structures may be at risk). The above examples are provided for illustration purposes only. It will be understood that these, and other, features may be realized via the situational control processes and remote control processes.

Figure 8:
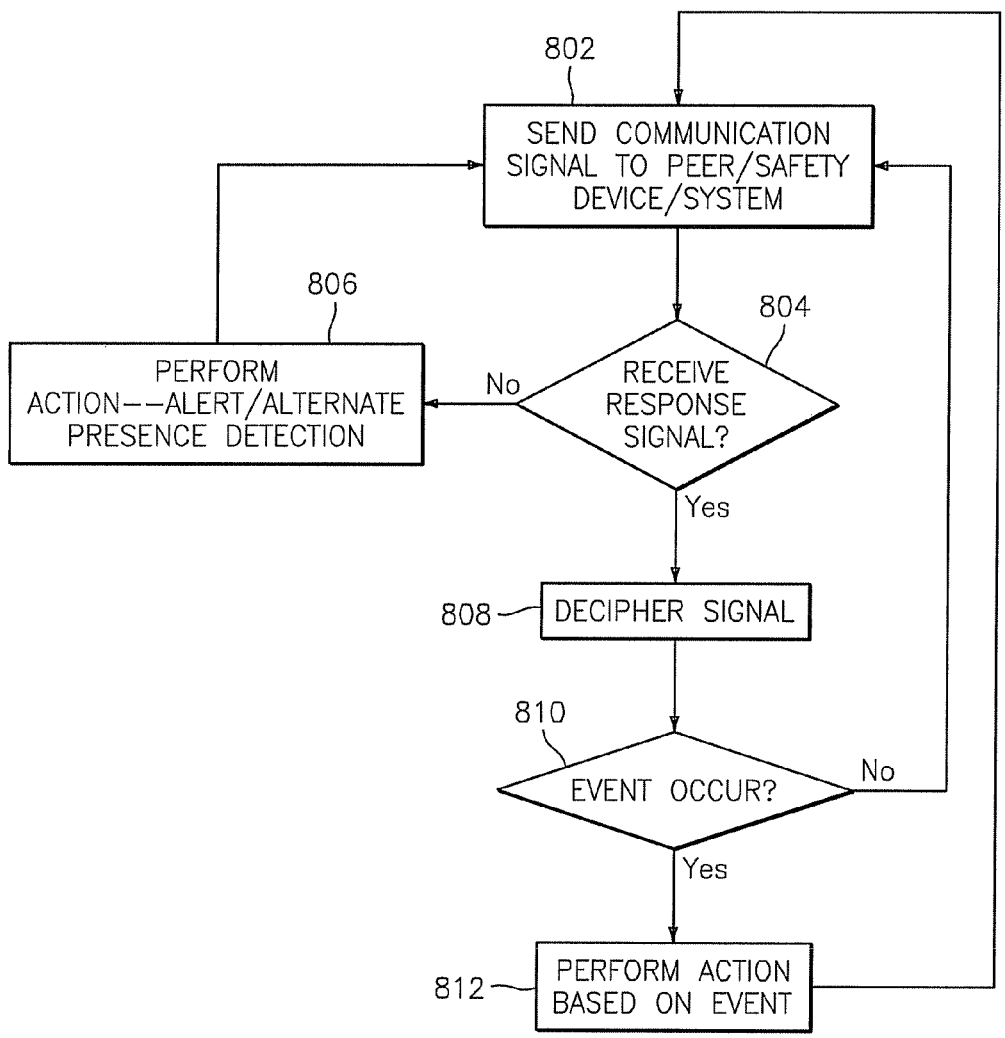
FIG. 8 is a flow diagram describing a process for implementing situational control processes in exemplary embodiments.

Turning now to FIG. 8, a flow diagram describing a process for implementing situational control processes in exemplary embodiments will now be described. At step 802, a safety device 102 transmits a signal. The signal may be transmitted in order to determine the absence or presence of other devices in range. The signal may alternatively be a signal instructing a peer device or other safety device to activate itself.

At step 804, it is determined whether the safety device 102 has received a response signal from another device. If not, the safety device 102 performs an action, based upon the rules configured via the device manager, e.g., 214, 314, for the device at step 806. The action may be to continue transmitting signals (e.g., flood the network or location) in order to detect any other devices in range for the purpose of partnering up with the newly detected device as a back up for the device, which was unable to respond. In alternative embodiments, the action performed at step 806 may be a notification generated and transmitted to a system, such as host system 110, alerting the system that a device may be out of service or is in need of inspection. Once this action has been performed, the process returns to step 802 whereby the device 102 continues to send communication signals.

If, on the other hand, the device has received a response signal from a peer device 104 in range at step 804, the device 102 deciphers the signal at step 808 to determine whether the signal relates to presence alert and detection or whether an event has occurred. Presence alert signals refer to those which simply provide notice that a device is active and operational. An event signal refers to that which indicates a condition or threat (e.g., fire, smoke, heat, toxins, etc.). These signals (e.g., presence alert and event) may be differentiated using any means known in the art, such as varying frequencies established for each signal type.

If the signal is a presence alert signal (i.e., the signal is not an event signal) at step 810, the process returns to step 802 whereby the device 102 continues to transmit signals to nearby devices. Otherwise, if the response signal is an event signal, the device 102 performs an action in accordance with the rules specified by device manager, e.g., 214, 314 at step 812. As indicated above, the action may include instructing a device to activate/de-activate, reset, record, communicate, etc.

Figure 9:
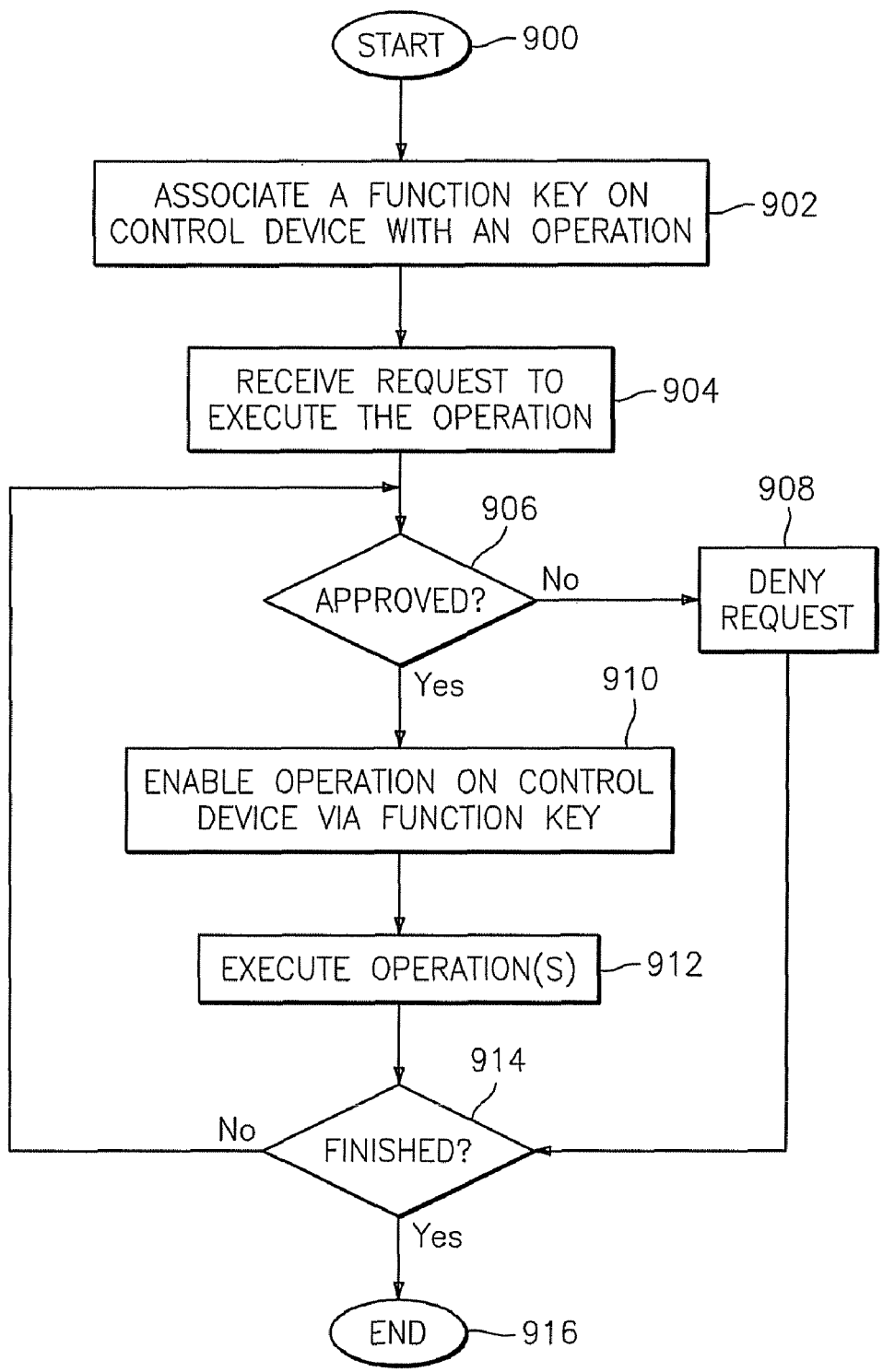
FIG. 9 is a flow diagram describing a process for implementing configuration and operation of a remote safety control device in exemplary embodiments.

Turning now to FIG. 9, a flow diagram describing a process for configuring and operating a remote safety controller 106 will now be described in exemplary embodiments. At step 902, an operation is associated with a function key on the remote safety controller 106. Operations include, for example, activating/de-activating, resetting, etc., one or more devices 102, 104, and/or systems. The association may be facilitated via a user interface of the programming module 610, input keys 604 and display screen 602 of the remote safety controller 106. Alternatively, some or all of these features may be enabled via the centralized safety systems control application 124 at host system 110 and transmitted over a network (e.g., network 108) to the remote safety controller 106. The remote safety controller 106 may also be programmed to operate by authorized individuals or for permitted devices via the security module 612. Once programmed, the remote safety controller 106 is ready for use.

At step 904, a request is received to execute an operation. This request may be implemented by selecting one of the function keys 606 on the remote safety controller 106 as applicable to the desired operation. At step 906, it is determined whether the requested operation has been approved. This may be implemented by comparing the requested operation with the permissions granted via the associations programmed into the controller 106. If there is a match, the request is approved. Alternatively, or in combination, the approval may be determined by transmitting a signal to the centralized safety systems control application 124 or system implementing the centralized safety systems control application 124 (e.g., incident command) whereby authorization of the requested operation is reviewed or considered by a supervising individual. The request may then be granted, if desired, by returning an authorization signal that enables the selected function key 606.

If the request has not been approved, the request is denied, and the operation is not performed by the remote safety controller 106 at step 908. The process proceeds to step 914 as described below. If, on the other hand, the request is approved at step 906, the operation is enabled on the controller 106 via the function key 606 at step 910, and the operation is executed at step 912. For example, an RF signal is transmitted from the controller 106 to the targeted device and is received at the targeted device via, e.g., IR detection elements. At step 914, it is determined whether a new request has been issued. If not, the process ends at step 916. Otherwise, the process returns to step 906.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method, comprising:
   receiving a request to execute an operation on a target device via selection of a function key on a remote control device, wherein the function key is associated with the operation and the target device that performs the operation for remotely controlling operation of the target device via a signal transmitted from the remote control device to the target device when the function key is selected;
   approving the request to execute the operation when authorization has been secured; and
   transmitting the signal from the remote control device to the target device in response to the approval;
   wherein the request to execute the operation via selection of the function key is received by a computer processor over a network, and the approving the request to execute the operation when authorization has been secured is performed via a response signal received from the computer processor based upon an evaluation of conditions determined to impact safety of individuals and property, the conditions relating to air quality, heat, water, and fire.

2. The method of claim 1, wherein the target device is a safety device, and the operation includes overriding operation settings programmed into the target device.

3. The method of claim 1, wherein the request to execute the operation via selection of the function key is received by the computer processor via a programming module in the remote control device; wherein the approving the request to execute the operation when authorization has been secured is performed by permissions rules configured into the remote control device.

4. The method of claim 1, wherein the target device is a safety device.

5. The method of claim 4, wherein the safety device is a detection device comprising
   a motion sensor.

6. An apparatus, comprising:
   a remote control device; and
   a programming module executing on the remote control device via a computer processor, the programming module performing:
     receiving a request to execute an operation on a target device via selection of a function key on the remote control device, wherein the function key is associated with the operation and the target device that performs the operation for remotely controlling operation of the target device via a signal transmitted from the remote control device to the target device when the function key is selected;
     approving the request to execute the operation when authorization has been secured; and
     transmitting the signal from the remote control device to the target device in response to the approval;
   wherein the request to execute the operation via selection of the function key is received by the computer processor over a network, and the approving the request to execute the operation when authorization has been secured is performed via a response signal received from the computer processor based upon an evaluation of conditions determined to impact safety of individuals and property, the conditions relating to air quality, heat, water, and fire.

7. The apparatus of claim 6, wherein the target device is a safety device and the operation includes:
   resetting the target device.

8. The apparatus of claim 6, further comprising a security module executing on the remote control device via the computer processor; wherein the request to execute the operation via selection of the function key is received by the security module in the remote control device; and wherein further, the approving the request to execute the operation when authorization has been secured is performed by permissions rules configured into the remote control device via the security module.

9. The apparatus of claim 6, wherein the request to execute the operation via selection of the function key is transmitted by the remote control device over a network, wherein the approving the request to execute the operation when authorization has been secured is performed via a response signal received from the computer processor at the remote control device.

10. The apparatus of claim 6, wherein the function key associated with the target device is configured to control operation of the target device, the target device comprising a safety device.

11. The apparatus of claim 10, wherein the safety device is a detection device comprising a motion sensor.

12. A computer program product, the computer program product including instructions for implementing a method, comprising:
- receiving a request to execute an operation on a target device via selection of a function key on a remote control device, wherein the function key is associated with the operation and the target device that performs the operation for remotely controlling operation of the target device via a signal transmitted from the remote control device to the target device when the function key is selected;
- approving the request to execute the operation when authorization has been secured; and
- transmitting the signal from the remote control device to the target device in response to the approval;
- wherein the request to execute the operation via selection of the function key is received by a computer processor over a network, and the approving the request to execute the operation when authorization has been secured is performed via a response signal received from the computer processor based upon an evaluation of conditions determined to impact safety of individuals and property, the conditions relating to air quality, heat, water, and fire.

13. The computer program product of claim 12, wherein the target device is a safety device and the operation includes activation of the target device;
- de-activation of the target device;
- resetting of the target device; and
- overriding operation settings programmed into the target device.

14. The computer program product of claim 12, wherein the request to execute the operation via selection of the function key is received by the computer processor via the remote control device; wherein the approving the request to execute the operation when authorization has been secured is performed by permissions rules configured into the remote control device.

15. The computer program product of claim 12, wherein the request to execute the operation via selection of the function key is transmitted over a network, wherein the approving the request to execute the operation when authorization has been secured is performed by a response signal received at the remote control device from the computer processor.

16. The computer program product of claim 12, wherein the target device is a safety device comprising a motion sensor.

17. The method of claim 1, wherein the target device is a safety device, and the request to execute the operation via selection of the function key is received by the computer processor over the network.

18. The method of claim 1, wherein the request to execute the operation via selection of the function key is received by another computer processor over a network, the method further comprising:
- overriding the operation subject to the request from the remote control device responsive to identifying, via the other computer processor, conditions undetectable by a user of the remote control device; and
- enabling another function key on the remote control device via the other computer processor, the other function key configured to cause the target device to mitigate aspects of the conditions undetectable by the user of the remote control device.

* * * * *